US005943824A

United States Patent [19]

Tatara

[11] Patent Number: 5,943,824

[45] Date of Patent: Aug. 31, 1999

[54] FIRE RATED, HINGED, SWINGING DOOR

[76] Inventor: Stanley R. Tatara, 4911 Schutt Rd., Akron, N.Y. 14001

[21] Appl. No.: 08/864,841

[22] Filed: May 29, 1997

[51] Int. Cl.[6] ........ B60J 5/00

[52] U.S. Cl. ........ 49/462; 49/383; 52/217; 52/656.3; 52/656.4

[58] Field of Search ........ 49/504, 383, 462; 52/211, 213, 217, 656.3, 656.4; 411/178

[56] References Cited

U.S. PATENT DOCUMENTS

| | | | |
|---|---|---|---|
| 1,961,006 | 5/1934 | Marty | 52/656.4 |
| 2,309,452 | 1/1943 | Hasenburger et al. | 49/504 |
| 2,538,925 | 1/1951 | Steffan | 49/504 |
| 3,270,477 | 9/1966 | Johnston | 52/656.4 |
| 3,354,586 | 11/1967 | Besten | 49/504 |
| 3,386,216 | 6/1968 | Zwickert | 49/504 |
| 3,585,770 | 6/1971 | Maizler | 49/504 |
| 3,924,373 | 12/1975 | Lizdas et al. | 52/656.4 |
| 4,043,239 | 8/1977 | DeFusco | 411/178 |
| 4,251,962 | 2/1981 | Langenhorst | 49/504 |
| 4,295,765 | 10/1981 | Burke | 411/178 |
| 4,698,944 | 10/1987 | Wilkins | 49/504 |
| 5,063,711 | 11/1991 | Huelin | 49/504 |
| 5,216,856 | 6/1993 | Schroeder | 49/504 |

*Primary Examiner*—Daniel P. Stodola
*Assistant Examiner*—Curtis A. Cohen

[57] ABSTRACT

A device for reducing the spacing between the lock side of a door and an adjacent member, such as another door or door frame, should the spacing between the member and lock side of the door increase to a point where the fire rating of the door and member is adversely effected. A generally L or U shaped metal edge guard is mounted by machine screws to metal studs which are threadably fastened to the lock side of the door. The spacing between the edge guard and lock side is varied by adjusting the position of the studs within the lock side of the door.

10 Claims, 2 Drawing Sheets

FIRE RATED, HINGED, SWINGING DOOR

BACKGROUND OF THE INVENTION

The invention relates to doors, especially swinging-type doors which are hinged to the door frame of an opening through which people pass. More particularly, the invention relates to a mechanism or device for maintaining a predetermined fire rating for such swinging-type doors.

Fire rating is an important safety factor in the protection of people within a structure, whether it be an office building, hospital, or nursing home for the sick or elderly. Fire ratings vary with the thickness of a door, or the material composition of the door. The spacing around the door between an adjacent door or door jamb of a door frame is also an important factor in providing and maintaining a predetermined, desired fire rating. The invention is concerned with such a factor.

Briefly stated, the invention is in a device which is mountable on the so-called lock edge or side of a swinging-type door for adjusting the spacing between the lock side of the door and an adjacent door or door frame to maintain the spacing necessary for the desired fire rating of the door.

DESCRIPTION OF THE DRAWING

The following description of the invention will be better understood by having reference to the accompanying drawing, wherein.

DETAILED DESCRIPTION OF THE DRAWING

Figure 2:
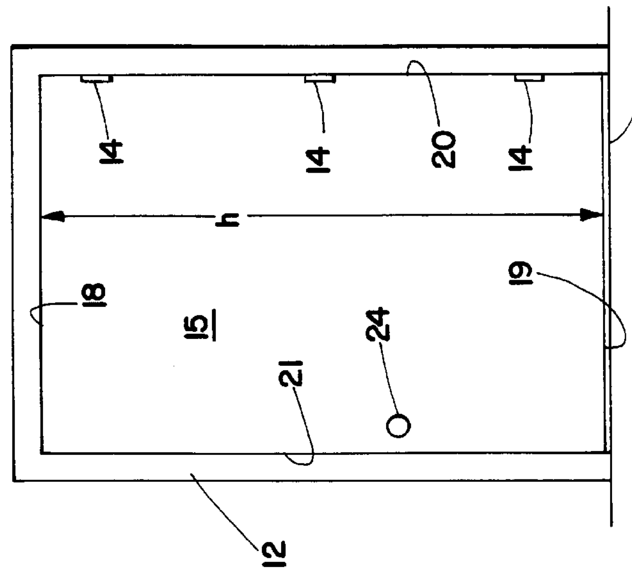
FIG. 2 is a side view of a single door mounted in a door frame.
Figure 1:
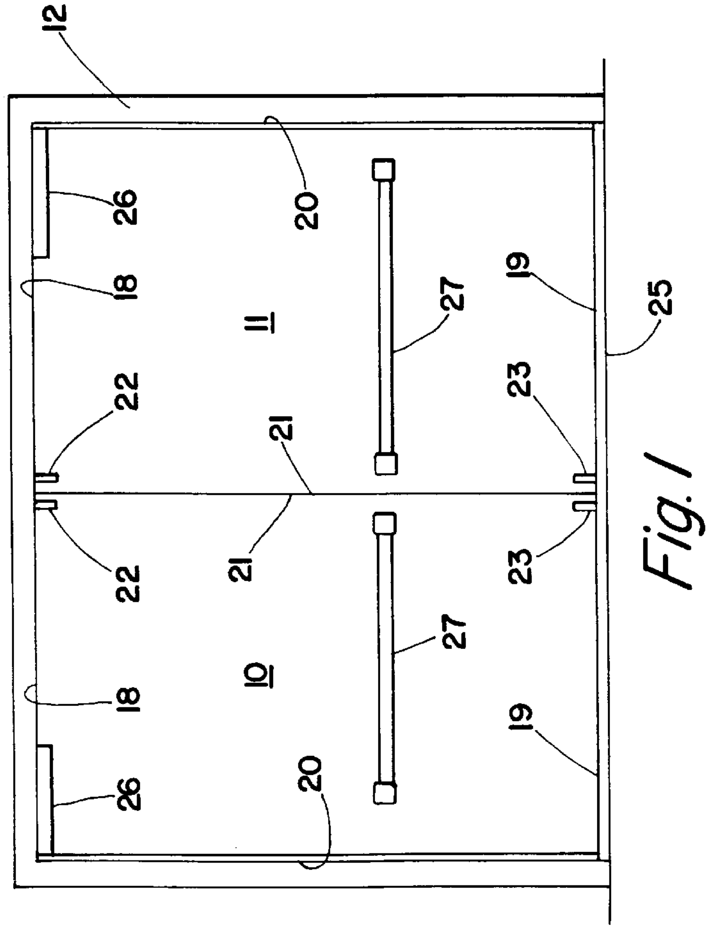
FIG. 1 is a side view of a pair of doors mounted in a single door frame.
Figure 3:
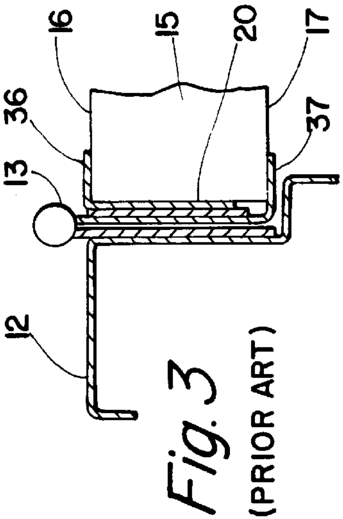
Fig. 3 (PRIOR ART)
FIG. 3 is a section of a continuous hinge which is presently used to mount the doors of FIGS. 1 and 2 to an adjacent door frame.
Figure 6:
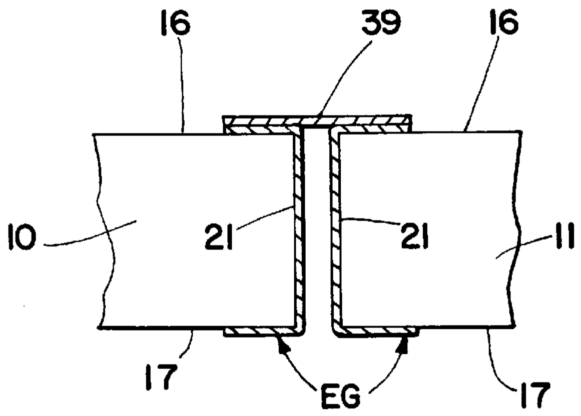
FIG. 6 is a section of portions of the lock edges of a pair of doors employing still another embodiment of the invention.

With general reference to the drawing for like parts and particular reference to FIG. 1, there is shown a pair of doors 10,11 which, for descriptive and claiming purposes, are disposed in vertical planes. The doors 10,11 are composed of any suitable fire rated material, such as wood or metal, and are mounted on the adjacent door frame 12 for swinging about parallel vertical axes by any suitable means, e.g. a continuous stainless steel piano-type, adjustable hinge 13 of FIG. 3, or a plurality of similar, individual stainless steel door butts or hinges 14 which, as seen in FIG. 2, are used to mount a single door 15 of fire rated material, to a similar but narrower door frame 12. Each of the doors 10,11,15 has a pair of opposing, rectangular, planar faces or surfaces 16,17 which are bounded by top and bottom edges or ends 18,19 and by a hinge edge or side 20 to which the hinges are secured, and a lock edge or side 21 which is in spaced, parallel relation from the hinge side 20. Any suitable locking mechanism can be used to hold the doors in a closed or locked position. For example, in FIG. 1, a pair of sliding surface bolts 22,23 are secured at the top and bottom ends 18,19 of the doors 10,11, adjacent the lock sides 21, to hold the doors 10,11 in a closed position, whereas in FIG. 2 a single passage or lock set 24 is provided. A metal threshold 25 can be used, if necessary. Also, as seen in FIG. 1, a pair of door operating safety devices 27, operatively connected to sliding door bolts similar to those previously described, can be used when required for fire exits.

Figure 5:
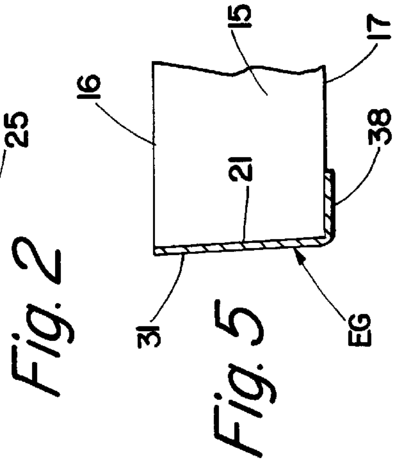
FIG. 5 is a section of a portion of the lock edge of a door employing another embodiment of the invention.
Figure 4:
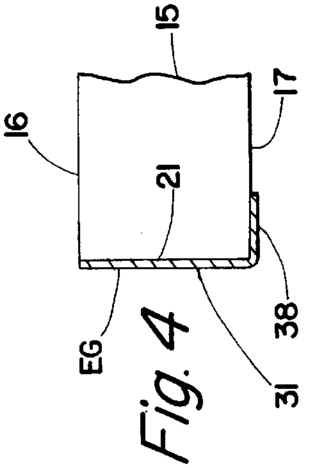
FIG. 4 is a section of a portion of the lock edge of a door employing one embodiment of the invention.
Figure 7:
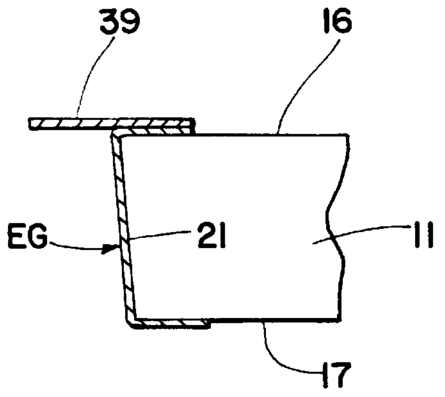
FIG. 7 is a section of a portion of the lock edge of a door employing still another embodiment of the invention.
Figure 8:
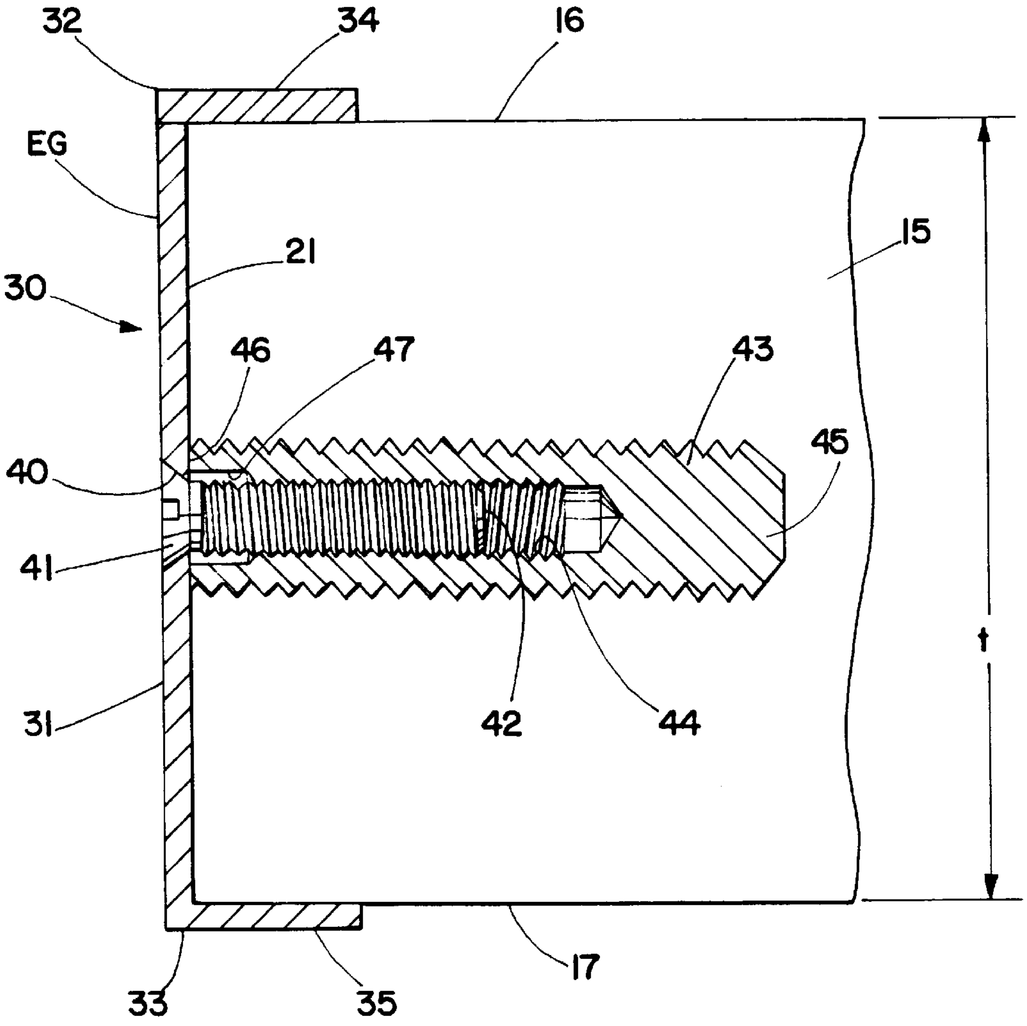
FIG. 8 is an enlarged section of a portion of the lock edge of a door designed to show in greater detail the device for adjusting the spacing between the lock edge of the door and an adjacent door or door frame.

As previously indicated, the fire rating of a door opening can be adversely effected by the spacing between the lock side of a door and an adjacent member, such as another door or door frame. An adjusting device 30 is provided to vary or adjust such spacing should it substantially increase for any reason. With general reference to FIGS. 4–7 for different embodiments of the invention, and particular reference to FIG. 8 for specific details of the invention, there is shown an adjusting device 30 which comprises a generally U-shaped edge guard EG that is composed of any suitable metal, such as 16 gauge stainless steel. The edge guard EG comprises a web 31 which covers the lock side 21 of, for example, the single door 15. That is, the web 31 is coextensive with the thickness t and height h (FIG. 2) of the single door 15. The web 31 has a pair of longitudinal, parallel marginal edges 32,33 from which angularly extend a pair of parallel flanges 34,35 which are about ¾ inches wide to partially overlap the adjacent faces 16,17 of the single door 15. The web 31 and flanges 34,35 are preferably flat, and the flanges 34,35 are at right angles to the web 31, except were the web 31 is beveled to match a beveled lock side 21, as best seen in FIGS. 5 and 7. The twin flanges 34,35 are normally used in conjunction with the continuous hinge 13 of FIG. 3, since the twin flanges 34,35 are designed to match the correspondingly sized twin flanges 36,37 of the continuous hinge 13. The edge guard EG is normally provided with a single flange 38, as best seen in FIGS. 4 and 5, when a number of single hinges 14, as seen in FIG. 2, are used.

An astragal in the form of a flat plate 39 may be secured to one 11 of the pair of doors 10,11 to act as a stop for the other 10 of the pairs of doors 10,11, and to seal the spacing between the pairs of doors 10,11.

The web 31 of the edge guard EG is provided with a number of conically shaped openings 40 which are each designed to matingly receive the flat head 41 of a machine screw 42 which is part of the adjusting device 30 which also includes a number of similar, solid, cylindrical metal studs 43, each of which has an internally threaded bore 44 for threadably receiving one of the flat headed machine screws 42. Each of the metal studs 43 is externally threaded to threadably engage the lock side 21 of the door 15, whether the lock side 21 of the door 15 be made of wood or metal. Each of the studs 43 has a closed end 45 opposite an open end 46 which is provided with an internally extending opening 47 which has a hexagonal cross section that is designed to matingly receive a conventional allen-type wrench for screwing or unscrewing the stud 45 into or out of the lock side 21 of the door 15. It can be appreciated by those skilled in the art that the outer diameter of the stud 43 will naturally be greater than the inside diameter of the closest, adjacent opening of the conical opening 40, such that, when in position, the web 31 will abut the adjacent outer exposed end 46 of the stud 43.

In operation, the adjusting device 30 is mounted on the lock side 21 of the door 15 by first positioning the edge guard EG on the lock side 21 of the door 15. A pencil or center punch is used, for example, to locate the spots or positions of the conical openings 40 on the lock side 21 of the door 15, A drill is then used to drill appropriately sized holes at the designated spots in the lock side 21 of the door 15, assumed to be made of wood, to threadably receive the studs 43. The edge guard EG is then firmly secured to the studs 43 and lock side 21 of the door 15 by means of the machine screws 42. To adjust or move the edge guard EG from this original rest position against the lock side 21 of the door 15, the machine screws 41 are first unscrewed, so that the edge guard EG can be removed, after which one or more studs 43 are backed out in the areas of concern. The edge guard EG is then remounted on the studs 43 and lock side 21 of the door 15.

The foregoing described adjusting device 30 was found to be the most practical way of mounting and adjusting the position of the edge guard EG. The machine screws 42 can be rotatably secured to the edge guard EG but, in such cases, a template would be needed to locate the conical openings 40 on the lock side 21 of the door 15. Moreover, the packaging of such an edge guard EG and attached machine screws would be more difficult than when the machine screws were detached from the edge guard EG and separately packaged.

Thus, there has been described a space adjusting device which is designed solely for use on the lock side of a door to maintain the fire rating of the door should the spacing at the lock side of the door, for any reason, increase to adversely effect the fire rating of the door. The adjusting device for the lock side of the door employs similarly designed studs used in the continuous, adjustable hinge shown in FIG. 3. The unique edge guards, described above, are presently used on wood or metal doors ranging in height from 6'–8" to 10'–0" and widths generally up to 4'–0".

What is claimed is:

1. A device for adjusting the spacing between a member and an adjacent swinging door which has a pair of large rectangular surfaces bounded by opposing rectangular top and bottom sides and a first and second vertical sides the device comprising:

a) a metal edge guard having, i) a planar web with a pair of opposing, parallel longitudinal marginal edges, the web being flat between said marginal edges and adapted to cover one of the first and second sides of the swinging door, the web having therein a plurality of conically shaped openings which are longitudinally spaced along the web between the marginal edges thereof, and ii) a planar flange secured to at least one of the marginal edges of the web and extending from the web in angular relation thereto, the flange being flat and coextensive with the web for covering at least a portion of an adjacent surface of the swinging door;

b) a plurality of elongated cylindrical studs having external threads for engagement in cylindrical openings in the swinging door in longitudinally spaced relation thereof, each of the threads of the studs having the same outer diameter throughout the entire longitudinal length and having an internally threaded bore which extends longitudinally into the stud from a configured opening which is designed to matingly receive an allen wrench for rotating the stud to screw the stud into and out of said openings; and c) a plurality of flat headed machine screws received in the conical openings of the web for head seated mating relation therein, and as the machine screws are screwed into threaded bores of adjacent studs, the screws move the web of the edge guard into abutting relation with the studs.

2. The device of claim 1, wherein the flange is disposed at right angles to the web.

3. The device of claim 1, which includes a planar flange at each of the marginal edges of the web and extending from the web in angular, parallel relation.

4. The device of claim 3, wherein the flanges are at right angles to the web, to form a U-shaped edge guard.

5. The device of claim 1, wherein the edge guard is composed of stainless steel.

6. A door hinged to a door frame for swinging about a vertical axis, comprising:

a) a pair of parallel rectangular surfaces bounded by rectangular top and bottom sides, a rectangular hinge side, and a rectangular lock side in opposed parallel relation to the hinge side and coextensive therewith, the lock side having a number of vertically aligned cylindrical openings longitudinally spaced therein;

b) a edge guard mounted on the lock side of the door, the edge guard including, i) a flat, planar web covering the lock side and separate therefrom, the web having, I) a plurality of conically shaped openings longitudinally spaced therein in aligned relation with the openings in the lock side, and II) a pair of opposing, parallel marginal edges, and ii) at least one flat, planar flange secured to one of the marginal edges and extending from the web in angular relation and partially covering an adjacent surface of the door; and c) means coacting between the edge guard and lock side of the door for varying the spacing between the web of the edge guard and the lock side, the means including:

d) a plurality of elongated cylindrical studs having external threads engaged in the openings placed in the lock side of the door in longitudinally spaced relation thereof, each of the threaded studs having the same outer diameter throughout the entire longitudinal length and having an internally threaded bore which extends longitudinally into the stud from a configured opening which is adapted to matingly receive an allen wrench for rotating the stud to screw the stud into and out of the openings in the lock side of the door; and e) a flat headed machine screw disposed in head seated relation in each of the conical openings in the web and being threadably engaged in the bore of an adjacent stud which is secured to the lock side of the door, the screws holding the edge guard tightly against the studs whose axial positions on the lock side of the door can be varied relative to the spacing desired between the web and an adjacent member.

7. The door of claim 6, wherein the edge guard is composed of stainless steel.

8. The door of claim 6, wherein the edge guard includes a flange at each marginal edge of the web, the flanges extending in parallel relation from the web.

9. The door of claim 8, wherein the flanges are at right angles to the web to form a U-shaped edge guard.

10. The door of claim 9, wherein the edge guard is composed of stainless steel.

* * * * *